United States Patent
Heile et al.

(10) Patent No.: US 6,321,369 B1
(45) Date of Patent: Nov. 20, 2001

(54) INTERFACE FOR COMPILING PROJECT VARIATIONS IN ELECTRONIC DESIGN ENVIRONMENTS

(75) Inventors: Francis B. Heile; Tamlyn V. Rawls, both of Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 08/958,626

(22) Filed: Oct. 27, 1997

Related U.S. Application Data

(60) Provisional application No. 60/029,277, filed on Oct. 28, 1996.

(51) Int. Cl.$^7$ ................................................. G06F 17/50
(52) U.S. Cl. ................................ 716/11; 716/3; 716/18
(58) Field of Search ..................... 395/500.12, 500.19, 395/500.02, 500.04, 500.05; 716/1, 3, 4, 11, 18

(56) References Cited

U.S. PATENT DOCUMENTS

| | | | | |
|---|---|---|---|---|
| 5,197,016 | * | 3/1993 | Sugimoto et al. | 716/8 |
| 5,452,227 | * | 9/1995 | Kelsey et al. | 395/500.04 |
| 5,473,547 | * | 12/1995 | Muroga | 364/489 |
| 5,499,192 | | 3/1996 | Knapp et al. | 364/489 |
| 5,513,124 | | 4/1996 | Trimberger et al. | 364/491 |
| 5,546,321 | * | 8/1996 | Chang et al. | 716/1 |
| 5,553,002 | * | 9/1996 | Dangelo et al. | 364/489 |
| 5,592,392 | * | 1/1997 | Matheson et al. | 716/16 |
| 5,594,657 | * | 1/1997 | Cantone et al. | 716/16 |
| 5,661,660 | | 8/1997 | Freidin | 364/489 |
| 5,691,912 | | 11/1997 | Duncan | 364/490 |
| 5,696,454 | | 12/1997 | Trimberger | 326/38 |
| 5,761,079 | * | 6/1998 | Drumm | 364/489 |
| 5,850,348 | * | 12/1998 | Berman | 716/6 |
| 5,867,399 | * | 2/1999 | Rostoker et al. | 364/489 |
| 5,946,219 | * | 8/1999 | Mason et al. | 716/16 |

OTHER PUBLICATIONS

Microsoft Press Computer Dictionary, third edition, Microsoft Press, pp 220, 511, 1997.*

* cited by examiner

*Primary Examiner*—Matthew Smith
*Assistant Examiner*—Leigh Marie Garbowski
(74) *Attorney, Agent, or Firm*—Beyer Weaver & Thomas LLP

(57) ABSTRACT

A method is provided in which a base design is generated in the form of one or more data files including assignment data. A variation design is created by adding at least one additional assignment associated with the variation design to the assignment data. The assignment data has an identifier that is associated with an entity defined within the base design, a first data field that can be used in making an assignment to the entity within the base design and a second data field for use in making the additional assignment to the entity within the variation design. The data files are compiled to generate a base output file and one or more variation output design files that can include one or more common result values. Comparison data is generated by comparing the common result values associated with the base design file and the variation design file. A design tool is provided for use with a computer system having a processor. The design tool includes a selector and a variation mechanism. Both the selector and variation mechanism are configured to run on the processor and are capable of accepting inputs from a user. The selector generates a base design in the form of one or more data files including assignment data. The variation mechanism generates a variation design by adding at least one additional assignment associated with the variation design.

21 Claims, 11 Drawing Sheets

| Parmeter | Base | VAR2 | VAR3 | |
|---|---|---|---|---|
| Fit? | Yes | Yes | No | |
| #LC | 1773 | +10 | -20 | |
| Devices | 3 | - | +2 | ... |
| F(max) | 50 Mhz | +5 Mhz | -10 Mhz | |
| TPD(max) | 20 ns | +2 ns | +4 ns | |
| ⋮ | ⋮ | ⋮ | ⋮ | |

INTERFACE FOR COMPILING PROJECT VARIATIONS IN ELECTRONIC DESIGN ENVIRONMENTS

CROSS-REFERENCE TO RELATED APPLICATION

This application claims priority from U.S. Provisional patent application Ser. No. 60/029,277, filed Oct. 28, 1996 and entitled Tools for Designing Programmable Logic Devices, which is incorporated herein by reference in it entirety for all purposes.

This invention is related to U.S. patent application Ser. No. 08/958,002, filed on the same day as this patent application, naming B. Pedersen et al. as inventors, and entitled "GENERATION OF SUB-NET LISTS FOR USE IN INCREMENTAL COMPILATION." That application is incorporated herein by reference in its entirety and for all purposes.

This invention is related to U.S. patent application Ser. No. 08/958,436, filed on the same day as this patent application, naming J. Tse et al. as inventors, and entitled "FITTING FOR INCREMENTAL COMPILATION OF ELECTRONIC DESIGNS." That application is incorporated herein by reference in its entirety and for all purposes.

This invention is also related to U.S. patent application Ser. No. 08/958,670, filed on the same day as this patent application, naming D. Mendel as inventor, and entitled "PARALLEL PROCESSING FOR COMPUTER ASSISTED DESIGN OF ELECTRONIC DEVICES." That application is incorporated herein by reference in its entirety and for all purposes.

This invention is also related to U.S. patent application Ser. No. 08/958,778, filed on the same day as this patent application, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434, filed on the same day as this patent application, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432, filed on the same day as this patent application, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414, filed on the same day as this patent application, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777, filed on the same day as this patent application, naming T. Southgate as inventor, and entitled "METHOD FOR SIMULATING A CIRCUIT DESIGN" That application is incorporated herein by reference in its entirety and for all purposes.

This invention is also related to U.S. patent application Ser. No. 08/957,957, filed on the same day as this patent application, naming F. Heile et al. as inventors, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798, filed on the same day as this patent application, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435, filed on the same day as this patent application, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431, filed on the same day as this patent application, naming F. Heile as inventor, and entitled "ELECTRONIC DESIGN AUTOMATION TOOL FOR DISPLAY OF DESIGN PROFILE." That application is incorporated herein by reference in its entirety and for all purposes.

BACKGROUND OF THE INVENTION

The present invention relates generally to methods and apparatuses used in creating and refining electronic designs, and more particularly to methods and apparatuses for use in design environments which support multiple variations of structural and/or functional entities within a design project.

Integrated circuits and in particular programmable logic circuits, such as programmable logic arrays and programmable gate arrays, are well known and can be designed for use in a variety of devices. These integrated circuits are typically designed with one or more software tools, such as design automation tools. By way of example, the MAX+PLUS® II development system available from the Altera Corporation of San Jose, Calif., provides a single integrated environment that offers such features as schematic, text and waveform design entry, compilation and logic synthesis, simulation and timing analysis, and device configuration.

The technical documentation available for the MAX+PLUS® II development system, such as "MAX+PLUS® II Programmable Logic Development System: Getting Started" (Version 6.0 Serial No. P25-04803-02) and the "MAX+PLUS® II Programmable Logic Development System AHDL" manual (e.g., Version 3.0, Serial Number P25-04804-00) are hereby incorporated for all purposes in their entirety, as are U.S. Pat. Nos. 4,609,986; 4,617,479; 4,677, 792; 4,774,421; 4,831,573; 4,864,161; 4,871,930; 4,899, 067; 4,899,070; 4,903,223; 4,912,342; 4,930,107; 4,969, 121; 5,045,772; 5,066,873; 5,091,661; 5,097,208; 5,111, 423; 5,128,565; 5,138,576; 5,144,167; and 5,162,680 which are mentioned therein.

Design tools, such as those provided in MAX+PLUS® II, may define an electronic design as a tree having multiple levels of entities that are arranged in a hierarchy. For example, a high level block might specify a processor having certain functionality. A low level entity might specify specific processing circuitry such as AND gates, accumulators, flip flops, multiplexers, etc. within the processor. By supporting multiple levels of entities within the design, these design tools allow for different levels of design abstraction. These different levels of abstraction typically allow designers to focus on custom structures and/or functions, reuse previously designed functions or design blocks, and/or build large and more complex megafunctions (i.e., off the shelf design blocks such as processors, DSP functions, bus controllers and interfaces) for later use. Thus, design tools such as these which present hierarchical designs and facilitate use of off the shelf entities can reduce the development time and lower the design costs.

As is well known, circuit designers typically use design tools to adjust or "tweak" particular entities to produce a specific result. For example, assume that a specific design block contains within it a logic block, such as an adder or multiplexer. The designer will typically specify that a multiplexer logic function, for example, is to be performed with a specific number of input signals, and that the output of the multiplexer logic function is to be provided to a specific circuit and/or pin. In defining the attributes of the multiplexer logic function, in this example, the designer may specify specific timing, sizing, location, and/or power requirements, or other like requirements that the resulting multiplexer circuit would be required to meet. These user specified attributes are commonly referred to as assignments or parameters.

For example, assume that the multiplexer logic function has a collection of logic option assignments known as "style" which can be set by the designer to define that the resulting multiplexer has a general behavior. Thus, for example, the designer may set "style" equal to "standard" (better fit) or to "fast" (better performance) depending upon the desired optimization. The design tool will then use the style attribute to select, for example, the proper components (e.g., logic elements of a programmable logic device) and/or location necessary to meet the timing requirements specified in the style attribute. Those skilled in the art will recognize that other styles, assignments, and/or parameters can be set or established in a similar fashion.

In conventional design tools, the attributes for an entity (e.g., identified function, circuit, component, and/or design block) are usually specified within an assignment file that is read during compilation stages. Various techniques are available for making an assignment to a particular entity. A "relative hierarchical assignments" technique will be described below.

Frequently, users want to compare related but distinct designs for achieving different goals, such as increasing device speed or fitting circuitry on a given chip or floorplan. Such different objectives could be supported by different assignments made globally or specifically within a bas e design. For designers seeking to compare the results of such different designs, such as for example designs having different assignments, the current generation of design tools require that several designs be created (e.g., each having differing assignments), stored, and compiled separately. This duplication of effort tends to be tedious, time consuming and can place a strain on processing and related computational resources.

In an effort to reduce the time required to create, compile, and simulate a variation of an existing design, some designers have been forced to create elaborate programs, such as Unix® shell scripts and the like, that parse through the design data files and change certain parameters. Those designers who do not have the ability, resources or time to create and test such programs are left to copying the design files and modifying the various parameters manually or through the design tool's interface. Such programs and/or manual manipulation techniques generally limit the user's efficiency. Moreover, these programs and/or manual techniques often output multiple versions of the associated design data files. These files must be identified as being associated with the correct design variation. In large designs and designs having many variations, the resulting number and overall size of the associated data files can be difficult to manage, thereby limiting the designer's efforts.

With this in mind, FIG. 1 is a flow-chart that illustrates a conventional design method 10 that might be used to vary the design of a circuit created with a design tool. Method 10 begins with the user creating an initial or first design with the tool in a step 12. The result of step 12 is that a first design is embodied in one or more associated data files 13, including for example first design data and first assignment data. In a step 14 the first design is typically compiled by way of the design tool. The results of the compile can then be recorded, as in a step 16.

Assuming that the designer wishes to create a variation of the first design, the designer can, for example, generate or create a program or script file in a step 18. Such programs or scripts are typically not supported by the design tool and as such the designer will usually require additional resources. In a step 20 the designer modifies the associated data files of the first design. This can, for example, include making a copy of the associated data files, renaming the files, etc., so as to not effect the actual first design.

Once a copy of the data files has been made, then the designer can manually change parameters or assignments therein, or can run the program or script to make specific changes to the file. The result of step 20 is that one or more variation data files are created, such as "Nth Design" files 21. In a step 22, the variation data files are compiled and the results are then recorded in a step 24. Notice that steps 20–24 can be repeated for any number of variations, and that each variation will result in another unique Nth design file.

For each variation a separate script or manual operation is required to modify the design. In addition, each variation has its own data files. Furthermore, once a variation has been created, the typical design tool does not provide a way for the designer to readily compare the results of the first design to the results of the variation.

Thus, what is needed are improved methods and apparatuses for use in design tools that allow the designer to create, maintain and compare multiple variations of a design without having to write complicated scripts or manually make multiple copies of the design files and manually or otherwise make changes to these files.

SUMMARY OF THE INVENTION

The present invention provides improved methods and apparatuses for use in design tools that allow the designer to create, maintain and compare multiple variations of a design. Specifically, the invention provides a graphical user interface that allows designers to conveniently generate and identify temporary variations on a base design. These variations change one or more assignments or parameters in the base design. Preferably, the interface also allows the base and variation designs to be compiled independently, while preserving the base design. Should the designer desire to replace the base design with a variation, the system/apparatus of this invention allows the designer to easily convert the variation to the base design by replacing the assignments/parameters in the base design with those in the variation. Finally, the system of this invention facilitates output of multiple compiled files in files that can be easily identified and compared. In one embodiment, the output is provided in a tabular form presenting the compilation of one or more variation designs and possibly the base design.

The method and apparatus of this invention may be generally employed to create and refine any electronic design, including a circuit board, a system of multiple electronic elements (e.g., a multichip module), or a single integrated circuit. In one preferred embodiment, the invention is employed to design programmable logic devices. For convenience, this specification will typically refer to design of integrated circuits. However, it should be understood that the invention is not so limited and may be employed to design any electronic design.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Project Variations

The following description of this invention references programmable logic device architectures conforming to some of the SRAM and EEPROM device families provided by Altera Corporation and set forth in Altera "1996 Data Book," Serial No. A-DB-0696-01, which is incorporated herein by reference for all purposes. In addition, some of the device design software is described herein as it relates to the MAX+PLUS® II development system described in "MAX+PLUS® II Programmable Logic Development System: Getting Started" (Version 6.0 Serial No. P25-04803-02) and the "MAX+PLUS® II Programmable Logic Development System AHDL" manual (e.g., Version 3.0, Serial Number P25-04804-00), both previously incorporated by reference. As many of the software and hardware features of the below described methods and systems require some knowledge of Altera's device family architectures and associated design environment (which is discussed in the above references), it is assumed that the reader is familiar with these references. It should be understood, however, that the present invention may be employed to design and program electronic designs other than those conforming to Altera's architectures (including non-PLD integrated circuits for example).

Generally, the present invention provides a simple mechanism for creating "variations" on a "base project" or "base design." These variations may then be compiled and compared to quickly and conveniently determine whether a particular design variation should be pursued. This allows the user to specifically set a few assignments or parameters to different values in the variation than they would have had in the base project. Every assignment or parameter that is not specified in the variation will cause the base project value to be used. Conversely, when a variation is active, a variation assignment overrides the equivalent base project assignment. This override happens before inheritance or any other method of resolving assignments is applied.

In accordance with one aspect of the present invention, a convenient user interface and associated variation control system eliminates the need to create separate programs or scripts that parse through and modify existing design files in an effort to create and compile a variation design. As will be discussed in greater detail below, the design variations of the present invention include within them data associated with a base design plus additional data or data fields that define the nature of the variation. Various apparatuses and methods are provided to generate and take advantage of this unique data. As a result of the methods and apparatuses of the present invention, the circuit designer's job is further simplified by including the possibility of efficiently creating, maintaining and/or comparing several variations within a single integrated design environment.

Figure 1:
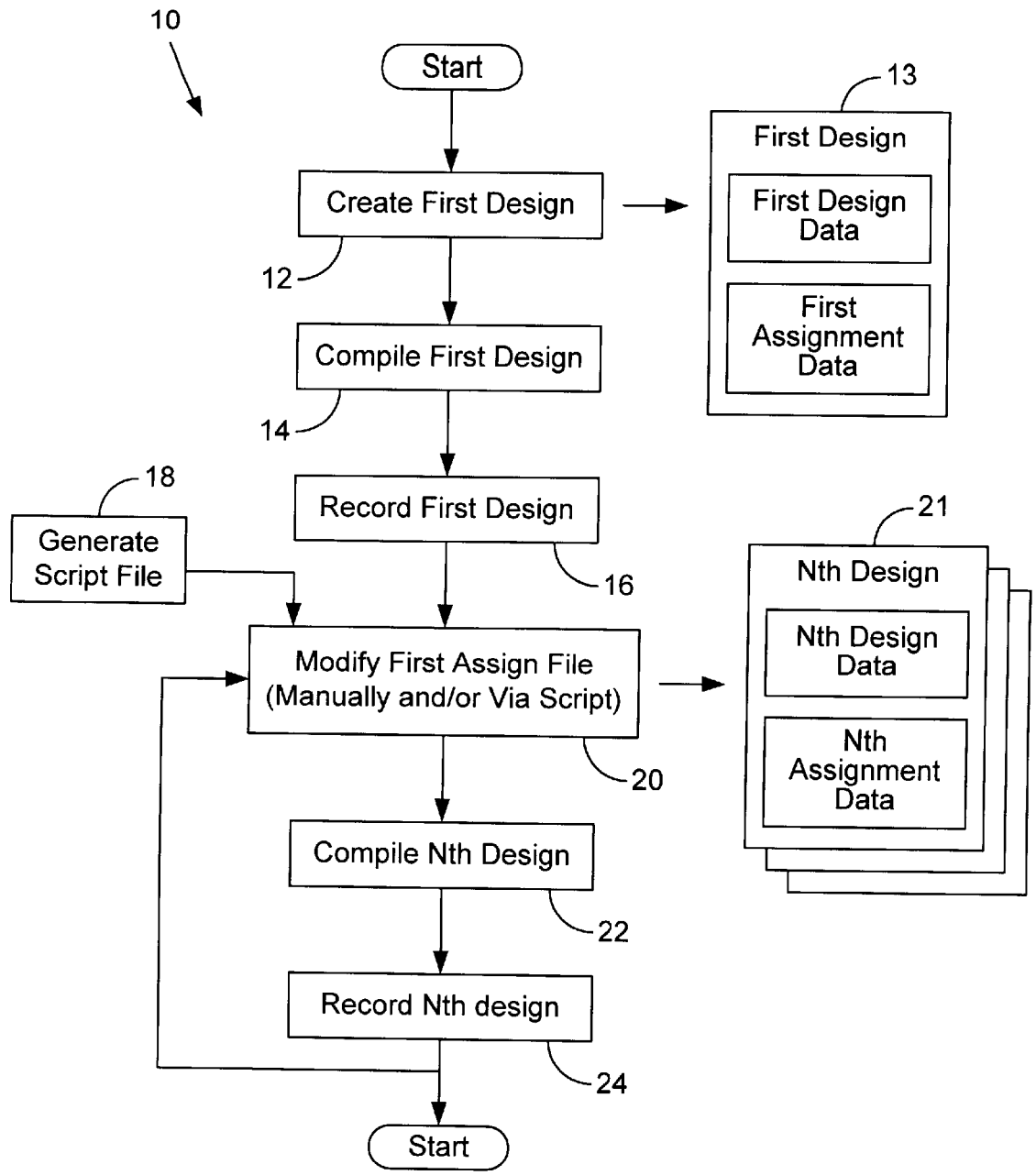
FIG. 1 is a flow-chart that illustrates a conventional design method that can be used to vary the design of a circuit created with a design tool.
Figure 2:
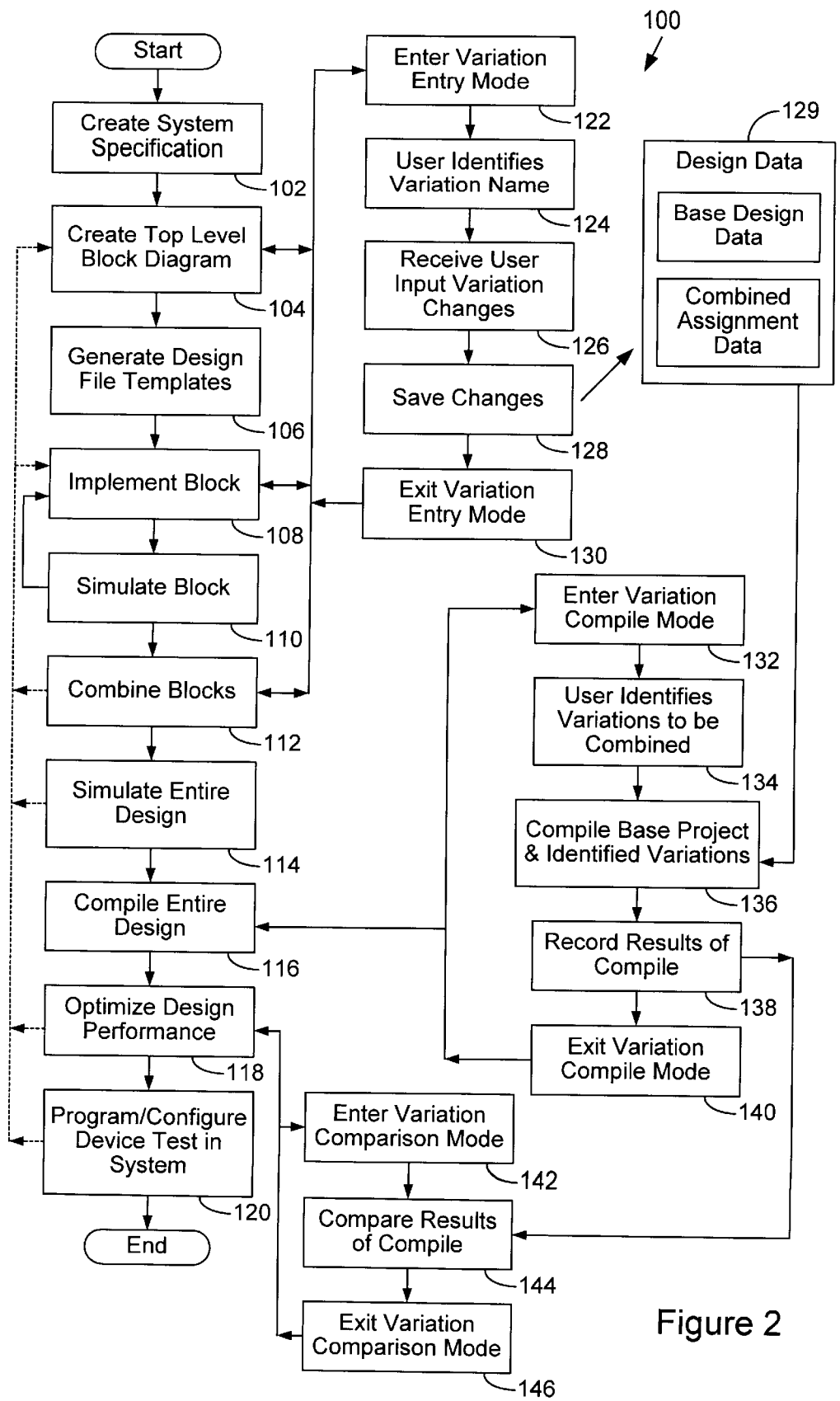
FIG. 2 is a flow-chart illustrating a design methodology in accordance with one embodiment of the present invention for use in a design tool capable of supporting multiple variations of a circuit design.

FIG. 2 is a flow-chart illustrating a general design methodology 100 in accordance with one embodiment of the present invention for use in a design tool capable of supporting multiple variations of a circuit design. This methodology is described in U.S. Provisional Application No. 60/029,277, previously incorporated by reference. Preferably, the method is implemented with a design tool made available to a designer as a sequence of programmed instructions or software.

Method 100 begins with a step 102 wherein the designer creates a system specification that describes, for example, the device pin names, the functionality of each of the pins, the desired system functionality, and the timing and resource budgets, and the like.

In a step 104 a top level block diagram is created. This can, for example, include providing drawings or otherwise providing a block diagram of the top level in which the connections between designs blocks are specified, at least in a general or approximate format. For most designs, this diagram will serve as the primary documentation for the design. As such, the target device, speed grade, and key timing requirements are usually specified at this level. Those skilled in the art will recognize that methodology 100 may also include blocks that have already have developed/implemented, and that this top level diagram can also be converted into an HDL file, or like file, for use in other related design tools, such as for example an external simulator.

A step 106 includes generating design file templates with the design tool for all blocks from the block diagram in step 104. After the designer has created a block which has not yet been implemented, the system may generate a design file template. Such templates may display a block in a window format including, for example, a title, a date, etc. around the boundaries. It may also include some details of the functional content depicted within the window. The design file templates may be in any specified design format including VHDL, AHDL, Verilog, block diagram, schematic, or other like format. In the case of a VHDL block the template may also include much of the formatting and necessary syntax for any VHDL block.

Next, in a step 108, a given block is implemented by the design tool. It is noted that for more complicated designs, there may be additional levels of block diagrams. Nevertheless, if changes are required at the top level then the top level block diagram is updated and the sub-designs are preferably automatically updated as well.

Furthermore, in step 108, a block may be compiled through to a fitting stage for a particular integrated circuit die to provide information about resource utilization, timing performance, and the like, as required for a given design. As such, it is envisioned that some timing optimization may be performed during step 108. With this in mind, one or more of the following factors can be used to determine the order in which blocks are implemented in step 108: (1) the complexity of a block; (2) the uncertainty or risk associated with a block; and/or (3) how far upstream and/or downstream in a given data-path the block resides.

In a step 110, the block is simulated functionally at the source level using a behavioral simulator, and vectors are generated, for example using a VHDL or Verilog test bench. The simulation results can then be displayed or otherwise presented/recorded as waveforms or annotated onto the source files.

Once the designer is satisfied with the simulation results, in a step 112 the block is combined with other blocks and the resulting group is simulated together. In some cases, it may be useful to complete a full compilation to provide critical resource and timing information. In step 112, the output simulation vectors from one block may become the input simulation vectors to the next block.

Next, in a step 114, the entire design is simulated functionally at the source level using a behavioral simulator. Before simulation can occur, however, the top level block diagram must be fully specified and show complete design connectivity. In step 114, vectors can be generated using a VHDL or Verilog test bench, for example. Again, the simulation results can be displayed either as waveforms or annotated onto the source files. The designer may also return to step 104 to modify the top-level block or to step 108 to implement a block again.

In a step 116, the entire design is compiled through to a file—sometimes referred to as to a "programming output file"—containing the information needed to implement the user's design in hardware. A wide variety of compile techniques may be used depending upon the type of design being created. For a PLD, compilation includes the steps of synthesis, place and route, generation of programming files, and simulation. For a traditional integrated circuit design with a custom layout, compilation includes a layout versus schematic check, a design rule check, and simulations. For integrated circuit design using a high level design tool, compilation includes synthesis from a language such as VHDL or Verilog, automatic place and route and simulations. For printed circuit boards, compilation includes automatic routing, design rule checking, lumped parameter extraction and simulation. Of course, other types of compilation and variations on the above are possible.

Following compilation in step 116, in a step 118, the timing checker inside the compiler can be used to determine if the performance goals for the design have been met. Also in step 118, timing simulations can also be used to check performance details. In addition, other analysis tools such as, for example, a design profiler and/or layout editor can be used to further optimize the performance of the design. Note that it is preferred, although not required, that optimization not be attempted prior to step 118 because full compilation is usually required to establish the location of one or more critical paths within the design.

Next, in a step 120, if the device is a programmable device, it can be programmed or configured and tested in the system. Notice that, as with previous steps, the designer can go back to previous steps, such as steps 104 and 108 within methodology 100 as needed during the design process.

While methodology 100 appears to cover only a top-down design process it can, nonetheless, also be used to support a more bottom-up type methodology. In a bottom-up design, for example, the flow is essentially the same as above except that each block doesn't have to be created since it would already exist.

With regard to multiple variations, in accordance with one embodiment of the present invention, the designer can for example, make an assignment, set a parameter or otherwise vary a base project design, at various stages in the design process, including, for example, when creating the top level block diagram in step 104, implementing a block in step 108, and/or combining blocks in step 112.

Figure 4A:
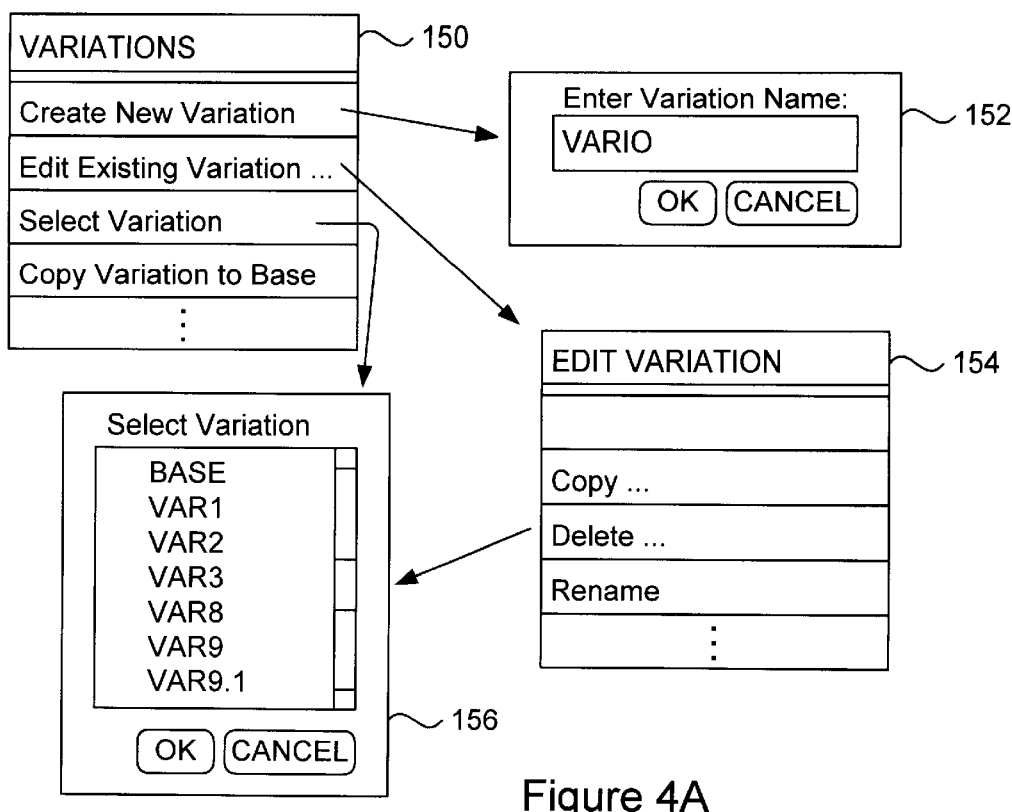
FIG. 4a illustrates a graphical user interface, in accordance with one embodiment of the present invention, that can be used by a designer to select a particular design to vary in accordance with the design methodology in FIG. 2.

A variation entry mode can be entered into in a step 122 as illustrated. One approach involves the user selecting a variation option from a menu of a graphical user interface. Then in a step 124, the designer identifies the name of the variation that he or she wants to work with. This can, for example, be accomplished by the designer selecting a preexisting variation by its name through a design tool interface displayed after an enter variation option has been selected. In a step 126 the designer inputs variation changes through the design tool. This can, for example, be accomplished by the designer making an assignment that causes an entity within the design to have a different function, configuration, location, and/or performance requirement. An interface allowing users to create, select, delete, etc. project variations is illustrated in FIG. 4a, described below.

Once all of the variation changes have been received, the variations are saved in a step 128 by selecting a "save" or "OK" button, for example. As illustrated, the result of step 128 is one or more associated data files 129 that include both original or base design data and assignment data, and additional assignment data that is associated with the variation changes in step 126. One preferred structure for data files 129 will be described below with reference to FIG. 3. The variation entry mode is completed in a step 130.

Preferably, the system allows the user to specify variations on certain specified assignments or parameters associated with a given base design project. Examples of such variable features include styles, logic options, "cliques," timing requirements, families/devices/speed grades, and sets of pin, logic cell or chip assignments, and global default parameters.

Styles, as described above, are global or specific goal oriented directions such as "normal" and "fast" for the compiler of a design. Other styles may specify that a design have a minimum size or that it fit within a specific target device family, for example. Logic option assignments allow the user to control the way that the design is mapped into the technology of the targeted device. These options can control the mapping of the design into special features of the device; examples of such features include the use of carry chains, cascade chains, packed registers and I/O cell registers etc. They can also control the techniques applied by the logic synthesizer; examples include duplicate logic reduction, refactorization and multi-level factoring etc. These and other logic options and logic synthesis styles are described in the above-referenced "MAX+PLUS® II Programmable Logic Development System AHDL" manual (see Section 2).

Carry chains and cascade chains, for example, combine the resources of proximate logic elements to form large high speed adders or counters (carry chains) and logic gates (cascade chains). Because carry chains and cascade chains limit routing flexibility, they should only be employed in applications where speed is particularly important. The programming software may not be able to deduce this, so use of carry chains and cascade chains may be set as a logic option.

Clique assignments define as a single named unit a group of logic functions (e.g., primitives such logic gates, I/O ports, and external pin connections or macrofunctions such as adders, multipliers, ALUs, buffers, counters, decoders, encoders, filters, multiplexers, and registers) that should be placed together. A clique assignment specifies which logic functions must remain together regardless of where the design tool positions them on a device. In a PLD, for example, a clique assignment may require that the named group of logic functions be provided in a single array unit such as a logic array block (LAB) used in PLDs such as the FLEX10K and FLEX 8000 family of devices available from Altera Corporation (see the Altera 1996 Data Book, Serial No. A-DB-0696-01 for further details). In alternative embodiments, less restrictive clique assignment may specify that the logic functions comprising the clique be positioned on a single row of a PLD, on a single chip of a multi-chip design, or on the "best fit" possible with the design.

Cliques allow designers to partition a project (design) so that only a minimum number of signals travel between LABs, rows, or chips. This ensures that no unnecessary LAB-to-LAB or device-to-device delays exist on critical timing paths. See, the "MAX+PLUS® II Programmable Logic Development System AHDL" manual (see Section 3).

Timing requirement assignments apply to design entities and include, for example, $T_{PD}$, $T_{CO}$, $T_{SU}$, $T_H$ and $F_{MAX}$ and also all timing cutoffs specified by the user. Timing requirements are commonly, though not necessarily, placed on input or output pins (for example, the assignments having to do with clocking ($T_{CO}$, $T_{SU}$, $T_H$ and $F_{MAX}$) can be placed on the clock pins). An assignment that is placed on a clock pin at the root may automatically be applied along the wire from the pin at the root to the clock pin at any lower level point at which a compile is initiated. In a preferred embodiment, the timing requirement assignments are "single-point" timing requirements. This means that a $T_{PD}$ assignment on an output pin, for example, requires that all input signals logically connected to that pin must meet the timing requirement. Alternatively, the timing requirements may be "two-point" timing requirements. A two point timing requirement specifies that from a designated input pin to a designated output pin, the $T_{PD}$ (or other timing requirement) is met.

Device families specify a given device architecture available from a vendor. For example, a user could specify that one variation of the project design requires implementation on the Altera FLEX 10K SRAM look up table (LUT) array architecture and a second variation requires implementation on the Altera MAX 9000 EEPROM product term (Pterm) array architecture. The user could further specify specific devices and speed grades within these families. Such options are described in the Altera 1996 Data Book available from Altera Corporation of San Jose, Calif.

Pin and logic cell assignments assign a single logic function, e.g., a primitive or macrofunction, to a specific pin or logic cell (fundamental recurring hardware element in some PLDs) within a chip. A chip assignment defines a group of logic functions as a single, named unit, and specifies that all functions must be placed on the same device. The chip assignment may merge with the "chip clique" described above.

Generally, any assignment (e.g., logic option, timing requirement, clique, style, device family, etc.) may also be applied in the form of a parameter. And as used herein, the term "assignment" refers to both assignments and application of parameters. One distinguishing characteristic of parameters that differentiates them from logic options and other type of assignments is that the name of the parameter is user defined. For logic options, styles and other types of assignments the name of the assignment is known to the system a priori, even if all possible sets of values are not known a priori. However, for parameters neither the name or value is known to the system ahead of time.

The purpose of parameters is to allow the user to parameterize various aspects of his or her design. For example, the width of busses could be specified as a parameter. Thus, changing a parameter usually results in some fundamental change in the functionality of the design. A user may specify variations having four different bus widths for example. In some hardware design languages there are language constructs which allow for the testing and setting of arbitrary parameter values for arbitrary parameter names. Such constructs may be used with this invention to control the parameter values of a variation.

In a preferred embodiment, the user allowed variations are limited to assignments and global parameters. Preferably, the parameter-based project variations suitable for use with this invention will be stored in a global project default file instead of with the design files for specific design entities. If the user wishes to vary the actual logic design itself, he or she could be required to modify the source code and maintain multiple versions of the source code that must be manually compiled with the different versions of the source files to compare the results.

Figure 4B:
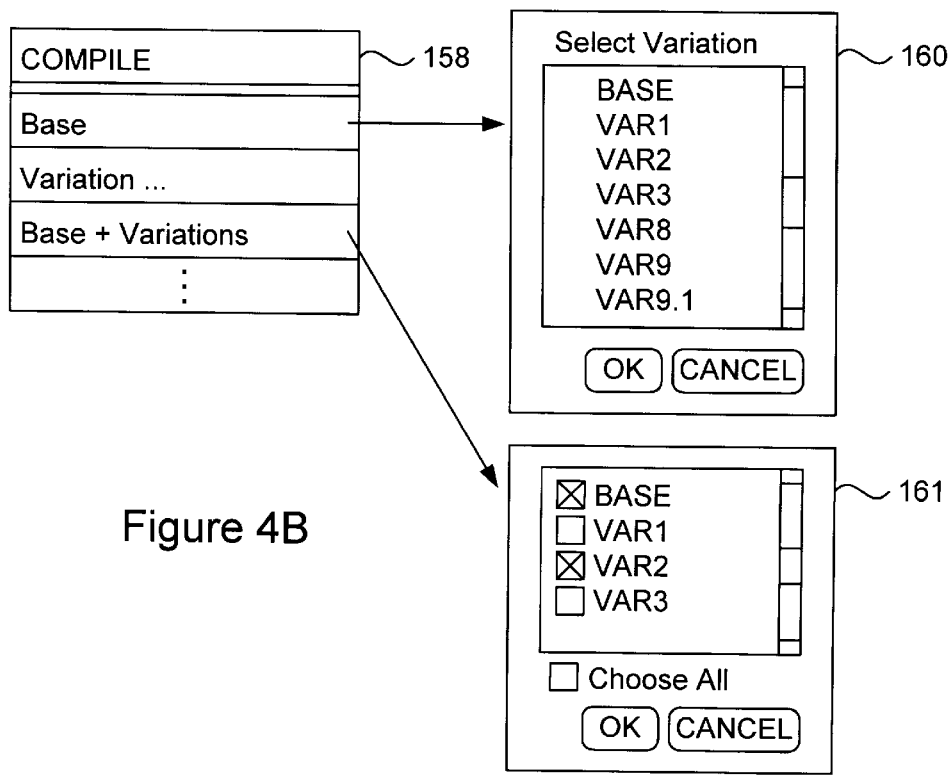
FIG. 4b illustrates a graphical user interface, in accordance with one embodiment of the present invention, that can be used by a designer to select a one or more designs to compile in accordance with the design methodology in FIG. 2.

Having created a variation in steps 122 through 130, a variation compile mode can be entered into beginning at a step 132. For example, the variation compile mode can be entered into during the compile in step 116. In a step 134, the designer identifies which variations are to be compiled along with the base design. This can, for example, also include the designer designating that a particular variation is to be the base design. In a step 136, the base and identified variations are compiled. In a step 138 the results from step 136 are recorded. Finally, the variation compile mode is completed in a step 140. An interface allowing users to select which variation(s) to compile, if any, is illustrated in FIG. 4*b*, described below.

In a preferred embodiment, compilation is permitted at any node in a design hierarchy which the designer designates as an "action point." Action points and their use described in U.S. Provisional Application No. 60/029,277 which was previously incorporated by reference. By default, a project root is an action point. Other action points must be specifically designated as such by the designer. When the project is compiled, the current action point will act as the root of the compile. Any action point which has a parent is compiled using parameters and logic options inherited from the parent, even though the logic of the parent design is not included in the compile. Thus, the action point allows compilation of only a portion of a project design (from the action point down to lower levels on its branch of the hierarchy). When an action point is an actual root, it will only inherit the project default settings (as there are no higher level entities from which it can inherit assignments).

The project variations feature of this invention preferably allows the designer to perform multiple different compiles on a single action point. Nevertheless, the project variations employed with this invention are preferably defined on a project wide basis rather than on an instance-specific basis to non-root action points. This is because all assignments, everywhere in the hierarchy tree, can contribute to the compile of an action point.

After a design variation has been compiled, the designer may wish to simulate its performance. As explained in U.S. Provisional Application No. 60/029,277, simulations may be performed at specific action points as well as on the whole design.

Figures 4C, 4D:
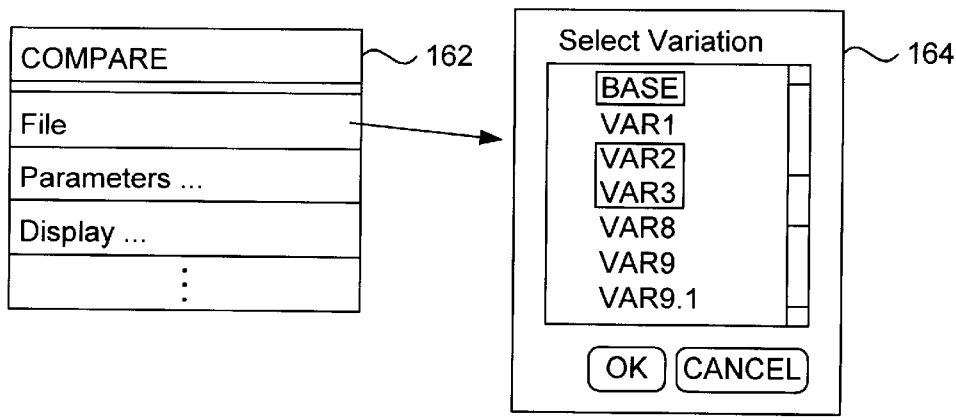
FIG. 4c illustrates a graphical user interface, in accordance with one embodiment of the present invention, that can be used by a designer to select which of the results from the compiled designs are to be compared in accordance with the design methodology in FIG. 2.
FIG. 4d illustrates a tabular output, in accordance with one embodiment of the present invention, that can be displayed or otherwise provided to the designer during a variation comparison mode in accordance with the design methodology in FIG. 2.

Having compiled the base design and one or more variations in steps 132–140, a variation comparison mode can be entered beginning at step 142. For example, the variation comparison mode can be entered into during any post-compile steps, such as step 118. In a step 144, the results of compiling the base design and variation designs are presented to designer. For example, the results recorded in step 138 can be presented in a textual and/or graphical format that allows the designer to compare the different designs. In a step 146 the variation comparison mode is completed. One interface and display for such comparison is illustrated in FIGS. 4*c* and 4*d*, described below.

It is recognized that the variation entry, compile and comparison modes described above can be completely separate or can be combined in other ways depending upon the overall methodology. Furthermore, it is recognized that the variation comparison mode described above can be removed and the designer can rely on conventional comparison techniques to compare the resulting designs.

Figure 3:
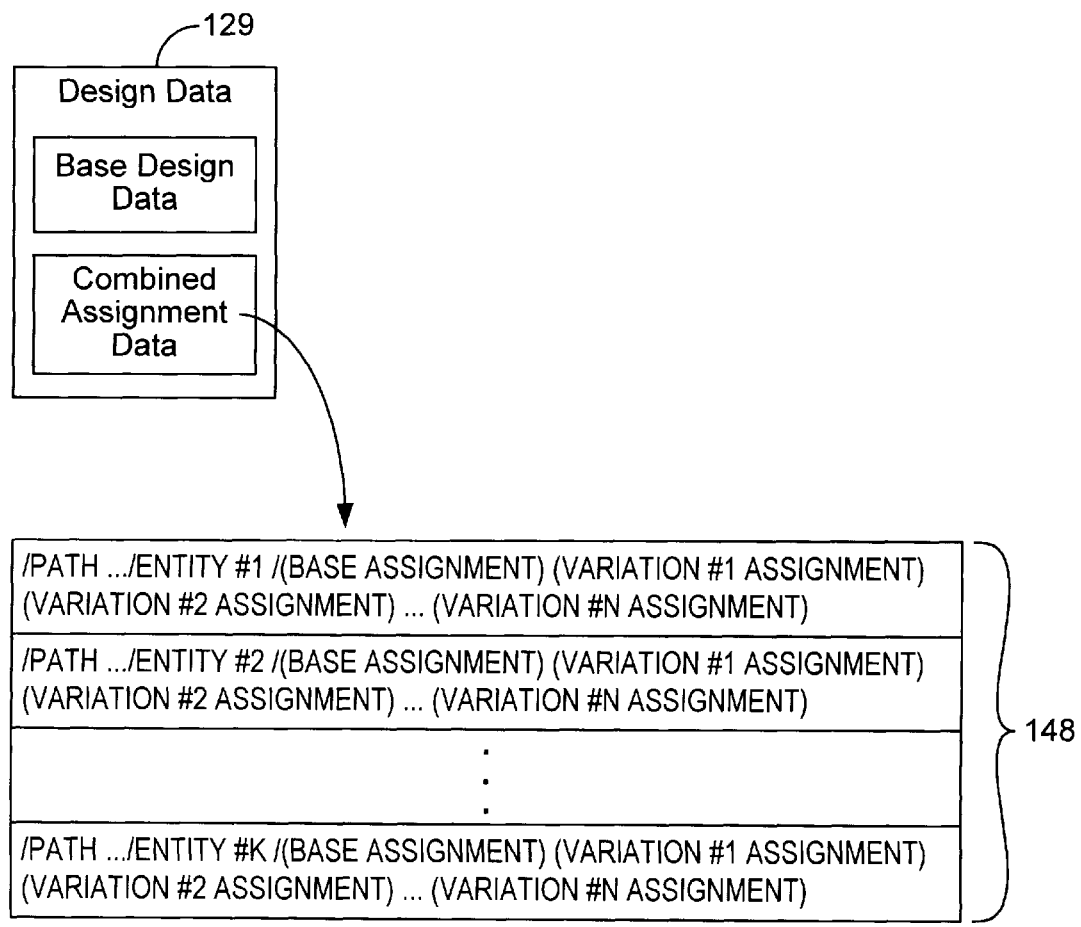
FIG. 3 is a block diagram illustrating an associated data file, in accordance with one embodiment of the present invention, that includes both base design data and data associated with one or more variation changes in accordance with the design methodology in FIG. 2.

FIG. 3 is a block diagram further illustrating an associated data file 129, in accordance with one embodiment of the present invention, that includes both base design data and assignment data, and additional assignment data that is associated with one or more variation changes (e.g., as provided in step 126 in FIG. 2). As shown, combined assignment data 148 is included along with a base design file. Combined assignment data 148 can, for example, result from the designer inputting different assignments for the base design and each of the variations.

By way of example, combined assignment data 148 is shown as having several assignments that are associated with either the base design or one of the variations to that design. For example, the first assignment shown identifies the entity to which the assignment is made; in this case the assignment is made to "ENTITY #1" located within the base design at a location defined by the "PATH". The PATH may be specified from a hierarchy root down, through intermediate entities, to the ENTITY #1. As shown, there is provided a field that can be used to list the assignment or assignments for ENTITY #1 for each design (e.g., base and variations). Thus, a "BASE ASSIGNMENT" field can be used to record any assignments made to ENTITY #1 in the base design. If no assignments were made, then the BASE ASSIGNMENT field can be left blank or otherwise identified as being unused for the base design.

Similarly, there is also provided a field (in combined assignment data 148) that can be used to list the assignment or assignments for ENTITY #1 for each variation design. Thus, a "VARIATION #1 ASSIGNMENT" field can be used to record any assignments made to ENTITY #1 in the variation #1 design. If no assignments were made, then the VARIATION #1 ASSIGNMENT field can be left blank or otherwise identified as being unused for the variation #1 design. Likewise, "VARIATION #2" through "VARIATION #N" assignment fields are also provided for ENTITY #1. When a variation field is left blank, the base assignment value, if present, is used instead. Thus, entries in the variation fields only record differences from the base.

Fields such as these are provided, therefore, for all entities that are subjected to an assignment in either the base design and/or in any variation design. This is illustrated in the subsequent assignments to "ENTITY #2" through "ENTITY #K" in FIG. 3. Notice that to replace the base design with a variation design (i.e., make the variation design the base design) the fields and/or assignment data associated with the base design need only be merged with the fields and/or assignment data associated with the selected variation design. In addition, any variation tag identifying an assignment as a variation will be removed.

In short, when an assignment is made in a variation, the base assignment is overridden. And when a variation assignment becomes a base assignment, then all non-blank variation assignments become the base assignments.

Any assignment (logic option, parameter, pin, chip, etc.) that differs from what the base project would have had may have an annotation (tag) on it to indicate that it came from a variation. When design tool editors show these assignments in the design files, some symbol may be appended to the value to indicate that it came from a variation. In dialog boxes or other interface elements showing such assignments, the system may explicitly indicate that it came from a variation by appending <variation_name> for example. An additional way of viewing the variation assignment values would be to simply list all the assignments in the variation with the appropriate points of attachment to positions in the design hierarchy.

So that the designer is immediately aware of the variation that has been chosen for the project, the system may append a variation tag such as the string "+<variation_name>" to indicia of the project variation. Such indicia include, for example, (1) the project name shown in a title bar for the user interface, (2) each action point name, and (3) all the files generated for an action point. The absence of "+<variation_name>" or other defined variation tag for any of these names will indicate that no variation has been chosen.

FIG. 4a illustrates a graphical user interface, in accordance with one embodiment of the present invention, that can be used by a designer to select a particular design to vary, for example, during the variation entry mode in FIG. 2. As shown, a variations menu 150 is presented to the designer. As shown, the designer can select various options that are associated with the designation of a design to be modified or otherwise varied. By way of example, in variations menu 150, the designer can choose to create a new variation, edit an existing variation, or select a base design. Of course, it is recognized that other related menu items can be provided in variations menu 150. For example, a user could replace a base design with a particular variation on that design.

With this in mind, assume that a designer who was currently working on a design, for example a base design, decides to create a variation design. In this case, the designer can select "Create New Variation" from variations menu 150 which can, for example, cause a inquiry box 152 to be presented to the designer. The designer can then enter the name of the new variation which will be based on the currently opened base design.

If, on the other hand, the designer wants to edit an existing variation, assuming one or more existed, then the designer can select "Edit Existing Variation". As illustrated, this selection can, for example, result in an EDIT VARIATION menu 154 being presented to the designer. Menu 154 can, therefore, be used to present a variety of editing choices to the designer. For example, as shown menu 154 includes choices such as copy, delete, rename, or the like. Once the designer has selected a particular editing choice then a select file box 156 can be presented that lists available designs such as the base design and variation designs. The designer can then simply select the variation that he or she wishes to delete or rename. In the case of copying, the designer will pick the two variations involved in the copy operation.

By way of further example, variations menu 150 is also depicted as having a "Copy Variation to Base" choice that can be used to make a variation design the base design. Thus, assuming that the designer is pleased with the results of a variation design and as such wishes to make the variation design the base design, the designer can use the Copy Variation to Base choice to open, for example, a selection mechanism such as select file box 156 to select a variation design and make it the base design.

When a new design project variation is created as described, the user may modify assignments and parameters according to those techniques generally provided with the design tool. For example, a relative hierarchical assignments technique, as described below, may be employed. Preferably, the designer will be made aware that he or she is editing an assignment or parameter in a project variation by display of a dialog box that requires the user to choose whether this edit should be applied to the variation or to the base project.

FIG. 4b illustrates a graphical user interface, in accordance with one embodiment of the present invention, that can be used by a designer to select one or more designs to compile, for example, during the variation compile mode in FIG. 2. As shown, a compile menu 158 can be presented to the designer. The designer can select various compile options, including one that compiles only the base design, one that compiles a variation design and one that compiles the base design and one or more variation designs. Once the designer has selected a compile option, the designer can, if required, be presented with a select files box 160 or 161, as shown, that can be used to identify the design(s) to be compiled during a specific compile step. It is recognized that additional compile options and/or feature can be added to menu 158 and/or box 160 to further specify the type of compile and/or compile options desired.

If the designer chooses to compile any (or all) variations for a given action point, preferably each of the compiler tools created will be uniquely identified by a tag such as "<action_point_name>+<variation_name>" so the user can easily distinguish them. In one embodiment, the compiler tools include a window that displays the compiler's progress during a compilation and eventually displays the full compile results.

FIG. 4c illustrates a graphical user interface, in accordance with one embodiment of the present invention, that can be used by a designer to select which of the results from the compiled designs are to be compared, for example, during the variation comparison mode in FIG. 2. As shown, a compare menu 162 can be presented to the designer. The designer can then select between various designs (e.g., files), parameters to be compared, and/or the type of display or output desired. It is recognized that a default or preset set of parameters and related display options can be included, such that the designer need only, in most cases, select the files to be compared. This can, for example, be accomplished through a select results box 164 that identifies the designs to be compared. For example, as illustrated in FIG. 4c, the designer has selected to compare three designs, namely the base design "BASE" and two variations "VAR2" and "VAR3". Again, it is recognized that additional comparison and display/output options and/or features can be added to menu 162 and/or box 164 to further specify the type of comparison desired.

FIG. 4d is a tabular output 166, in accordance with one embodiment of the present invention, that can be displayed or otherwise provided to the designer during the variation comparison mode in FIG. 2. As shown, particular compiler result values associated with the selected designs (e.g., the base and two variation designs selected above) are presented in tabular output 166. By way of example, a "Fit?" compiler result value is included in which the designer is informed as to whether the resulting design will fit within a specific target integrated circuit, device and/or package. As shown, the first two designs (i.e., BASE and VAR2) produced a design that will fit, however the third listed design (i.e., VAR3) will not fit.

Other exemplary compiler result values are shown to illustrate that the comparison mode can be used to examine several different compiler result values. For example, the numbers of logic cells (LCs) and/or devices in the resulting circuit can be presented. Additionally, the min/max and/or average operating frequencies and other timing related performance compiler result values can also be compared (as required). Thus, for example, the maximum frequency of each of the designs is compared in tabular output 166, wherein the difference between each of the variation designs as compared to the base design is shown. Also, for example, the maximum propagation delay (e.g., for a defined path/ thread) through each design can be compared. While not shown in the figure, the best performing design for each of the compiler result values can also be specifically highlighted to draw the designer's attention to it. It is further recognized that other displays can be presented in the variations comparison mode, such as for example, a timing diagram or other comparison type graph.

Relative Hierarchical Assignments

As noted above, assignments are commonly applied to specific circuit entities in the base design and variations thereon. In conventional design tools, the attributes for an entity (e.g., identified circuit, component or design block) are usually specified using one of two assignment techniques. In the first assignment technique the identified entity is uniquely specified, for example by its exact location within the hierarchy of the integrated circuit, and its attributes are specified. This is typically referred to as an "instance specific" assignment. To specify the exact location of the entity within the hierarchy, the designer typically begins at the highest level circuit and traces a path down through the hierarchy to the entity itself.

In the second assignment technique the actual location of the entity within the hierarchy is not considered; instead, all similarly identified entities, for example entities having the same name, share a common or globally set attribute that is applied to each entity. This is typically referred to as a "file specific" assignment.

A third type of assignment technique is preferred for use with this invention. This technique is referred to as the "relative hierarchical assignment" technique and is a hybrid of the file specific and instance specific assignments. Like an instance specific assignment, it may be defined by a path from a higher level entity. However, that path need not be traced all the way back to the root entity. Rather, it can be traced to an entity only one or a few levels above the entity to which the assignment is applied.

Figure 5A:
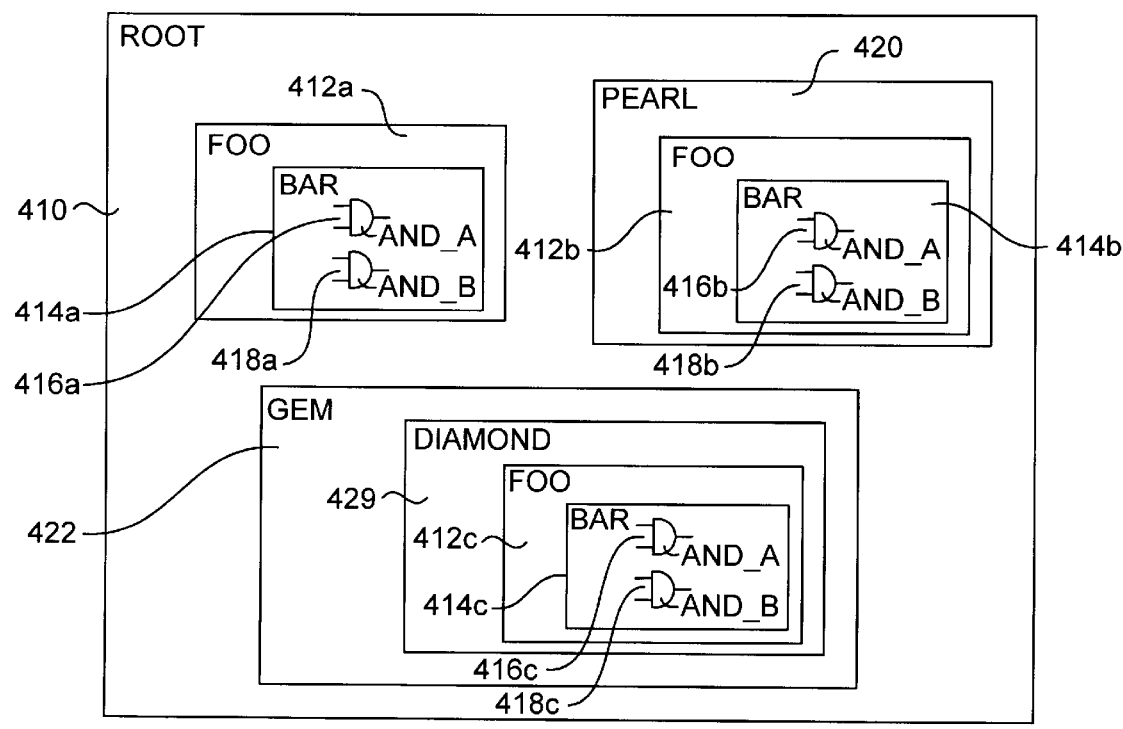
FIG. 5A is a block diagram illustrating a typical integrated circuit having a top level circuit and a plurality of lower level circuits therein.
Figure 5B:
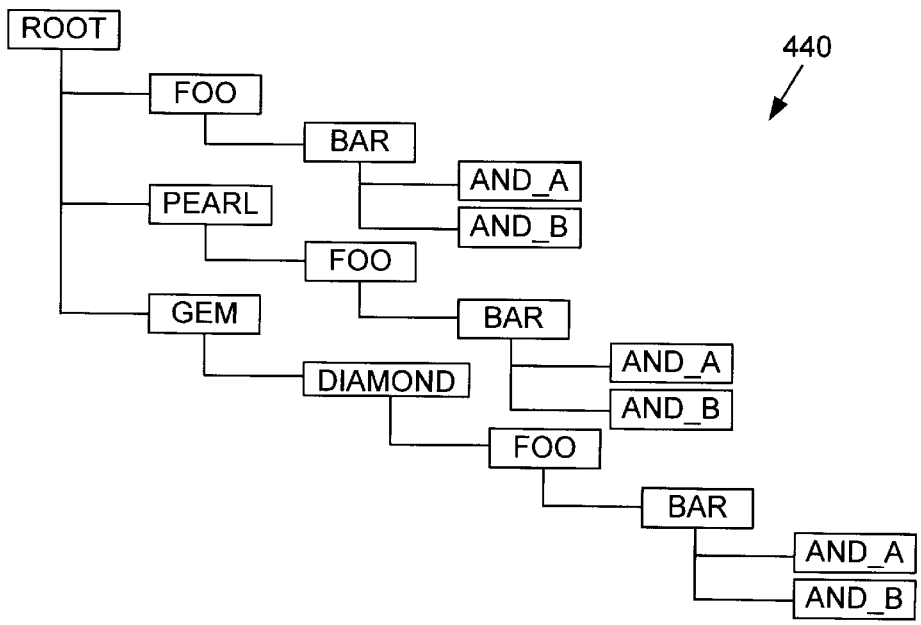
FIG. 5B illustrates a hierarchical structure associated with the integrated circuit in FIG. 5A.

To illustrate the three types of assignment methodology, FIGS. 5A and 5B present a hierarchical arrangement of an electronic design. FIG. 5A is a block diagram illustrating an integrated circuit having a ROOT entity 410 and a plurality of lower level circuit entities therein. As shown, within ROOT circuit 410 there is a FOO circuit 412a that further includes a BAR circuit 414a having a first logic gate AND_A 416a and a second logic gate AND_B 418a therein. FOO circuit 412a may represent any type of circuit, including other circuits and/or components. As such, the inclusion of logic AND gates (416a and 418a) within BAR circuit 414a is only one example of the types of circuits within either the BAR, FOO and/or ROOT circuits.

Also shown within ROOT circuit 410 there is a PEARL circuit 420 that includes a similarly arranged FOO circuit 412b that includes a BAR circuit 414b having a first logic gate AND_A 416b and a second logic gate AND_B 418b therein. Finally, as shown in FIG. 5A there is also a GEM circuit 422 that includes a DIAMOND circuit 424. Within DIAMOND circuit 424 there is another FOO circuit 412c that includes another BAR circuit 414c having first and second logic gates, AND_A 416c, and AND_B 418c, respectively, therein.

The hierarchical structure of the integrated circuit in FIG. 5A is illustrated in a hierarchical diagram 440 in FIG. 5B. As shown, at the top of the hierarchy is ROOT circuit 410. The next level of circuits includes FOO circuit 414a, PEARL circuit 420 and GEM circuit 422. Immediately below FOO circuit 414a is BAR circuit 414a. As described above, one possible way to define an entity is to describe its location within the hierarchy. This can be accomplished, for example, by defining a path leading from the highest level to the entity. For example, to define AND_A 416a with a path, the path would be "ROOT/FOO/BAR/AND_A". This path can, for example, be used by a designer to make an instance specific assignment to AND_A 416a. By way of example, the designer could input "ROOT/FOO/BAR/AND_A (style=fast)" to set the style attribute of AND_A 416a to fast (as opposed to standard in the example above).

Continuing down hierarchical diagram 440, immediately below PEARL circuit 420 is a second instance of a FOO/BAR circuit arrangement that leads ultimately to AND_A 416b and AND_B 418b. As before, a path can be used to define the entities within this hierarchical branch. For example, to define BAR circuit 412b, the path would be "ROOT/PEARL/FOO/BAR". For an instance specific assignment such as style equals fast to be made to AND_A 416b the designer would therefore input "ROOT/PEARL/FOO/BAR/AND_A(style=fast)".

The last illustrated branch of hierarchical diagram 440 includes GEM circuit 422 and DIAMOND circuit 424, followed by another instance of a FOO/BAR circuit arrangement that leads ultimately to AND_A 416c and AND_A 418c. In this case, a style equals fast instance specific assignment for AND_A 416c can be made by inputting "ROOT/GEM/DIAMOND/FOO/BAR/AND A(style=fast)".

To make a relative hierarchical assignment ("RHA"), the designer need only specify a particular relative path within the hierarchy sufficient to identify the entity to which the assignment is applied. For example, to make a RHA the designer can specify a point of attachment within the various levels of the hierarchy along with a path leading from the point of attachment to the point of application, that is the entity to which the assignment is being made.

If the point of attachment is the root, the assignment is instance specific as described above. If the point of attachment is an entity to which the point of assignment is being made, the assignment is file specific as described above. By allowing flexibility to set the point of attachment at any point between the root and the entity of interest, RHA provides designers with a powerful tool for making assignments as narrow or broad as necessary to support large entity portability, minimal assigning operations, maximum specificity, etc., depending upon the designers criteria.

Figure 6A:
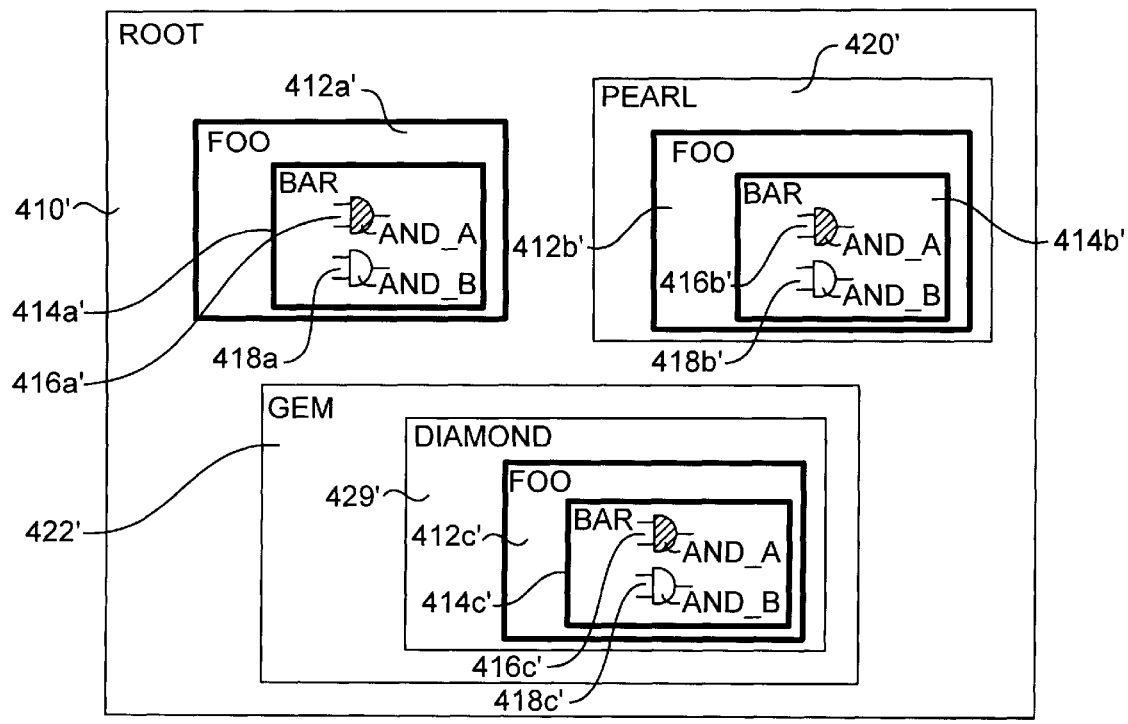
FIG. 6A is a block diagram illustrating an integrated circuit and the effects of a relative hierarchical assignment (RHA) thereon, in accordance with one embodiment of the present invention.

With this in mind, FIG. 6A is a block diagram illustrating an integrated circuit that is similar to the circuit illustrated in FIG. 5A, above. Thus, the integrated circuit in FIG. 6A includes a ROOT circuit 410' having within it a FOO circuit 412a', a PEARL circuit 420' and a GEM circuit 422'. Within FOO circuit 412a' there is a BAR circuit 414a' having a first logic gate, AND_A 416a', and a second logic gate AND_B 418a. Notice that FOO circuit 412a', BAR circuit 414a' and AND_A 416a' have been highlighted to illustrate that a relative hierarchical assignment (RHA), in accordance with one embodiment of the present invention, has been made.

As shown, the RHA begins with (i.e., was attached to) FOO circuit 412a' and ends at (i.e., is applied to) AND_A 416a'. The RHA, therefore, will be applicable to any similar relative hierarchical path within ROOT circuit 410'. In this example, the path associated with the RHA is "FOO/BAR/AND_A". By way of example, the RHA may be "FOO/BAR/AND A(style=fast)", which would make AND_A 416a' be assigned to a style of fast, as described above. Thus, anywhere that this relative hierarchical path occurs within the hierarchy of ROOT 410', the RHA will be made. The point of attachment (i.e., FOO) and point of application (i.e., AND_A) for the RHA will be discussed in greater detail in the description of FIG. 6B, below.

Figure 6B:
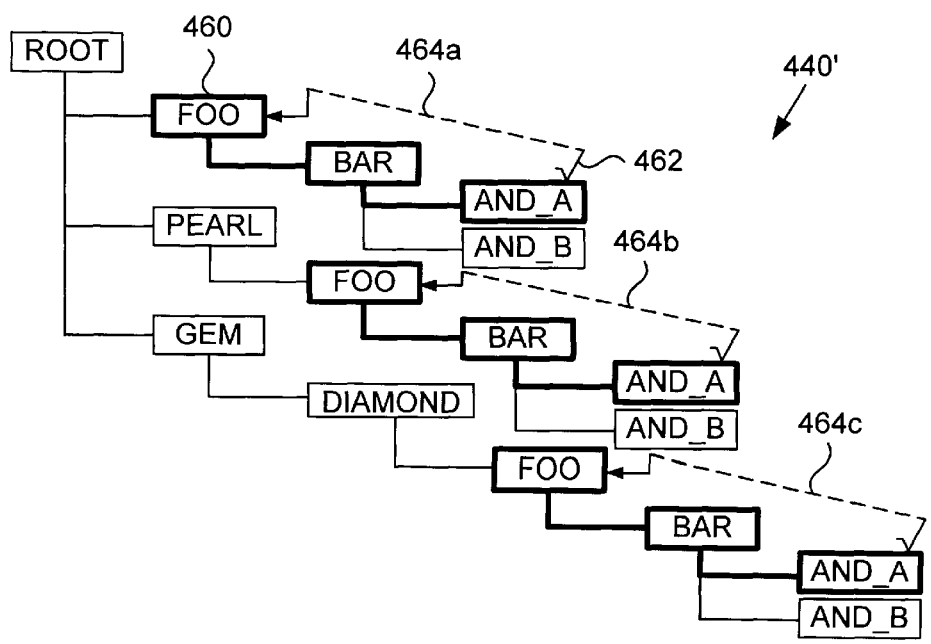
FIG. 6B illustrates a hierarchical structure associated with the integrated circuit in FIG. 6A, and the effects of a relative hierarchical assignment (RHA) thereon, in accordance with one embodiment of the present invention.

Before proceeding to the discussion of FIG. 6B, attention is drawn to the additional circuits within ROOT circuit 410' as illustrated in FIG. 5A. Notice that PEARL circuit 420' includes a FOO circuit 412b' having within it a BAR circuit 414b' that includes a first logic gate, AND_A 416b', and a second logic gate AND_B 418b. Here, again, FOO circuit 412b', BAR circuit 414b' and AND_A 416b' have been highlighted to illustrate that a RHA, in accordance with one embodiment of the present invention, has been made. Notice that the relative hierarchical path within PEARL circuit 420' matches the path of the RHA which is "FOO/BAR/AND_A". Thus, the RHA described above will also be applied to AND_A 416b' within PEARL circuit 420'. Likewise, there is also "FOO/BAR/AND_A" relative hierarchical path within DIAMOND circuit 424' which is itself located within GEM circuit 422'. Again, the RHA will be applied to AND_A 416c' within BAR circuit 414c' and FOO circuit 412c'.

The hierarchical structure of the integrated circuit in FIG. 6A is illustrated in a hierarchical diagram 440' in FIG. 6B. As shown, at the top of the hierarchy is ROOT circuit 410'. The next level of circuits includes FOO circuit 414a', PEARL circuit 420' and GEM circuit 422'. The exemplary RHA described above is further illustrated in each of the branches of hierarchical diagram 440'. In making an RHA the circuit designer specifies a relative point of attachment within the hierarchy and the path leading to the point of application for the assignment. As illustrated, for example, a point of attachment 460 has been defined at FOO circuit 412a' and a point of application 462 has been defined at AND_A 416a'. As a result, an RHA path 464a is defined as leading from point of attachment 460 to point of application 462. In this example, RHA path 464a is "FOO/BAR/AND_A". Again, an example of an RHA is "FOO/BAR/AND_A (style=fast)".

As further illustrated in FIG. 6B, within the next branch of hierarchical diagram 440' beginning with PEARL circuit 420', there is a second, matching RHA path 464b. Notice that RHA path 464b is "FOO/BAR/AND_A" which is the same as RHA path 464a. As a result, the RHA described above is therefore also applied to RHA path 464b. Thus, for example, if the RHA is "FOO/BAR/AND_A(style=fast)" then AND_A 416b' will be assigned style equals fast.

Likewise, within the third branch of hierarchical diagram 440' beginning with GEM circuit 422', there is a third, matching RHA path 464c. As before, RHA path 464c is "FOO/BAR/AND_A" which is the same as both RHA path 464a and RHA path 464b. As a result, the RHA described above will also be applied to RHA path 464c. Therefore, once again, if the RHA is "FOO/BAR/AND_A(style=fast)" then AND_A 416c' will be assigned style equals fast.

Notice, that by using an RHA the exact location of a particular circuit, component or design block, in relation to the top level circuit (here ROOT circuit 10') need not be provided by the circuit designer. As a result, in most cases new circuits can be imported into higher level circuits without having to modify the circuit's assignments to account for the new hierarchy. Moreover, by specifying a RHA path particular assignments can be made to specific instances of entities, such as circuits, components or design blocks, without having to change the entities' names or otherwise create a hybrid group of entities that are governed by a file specific assignment.

Figure 7:
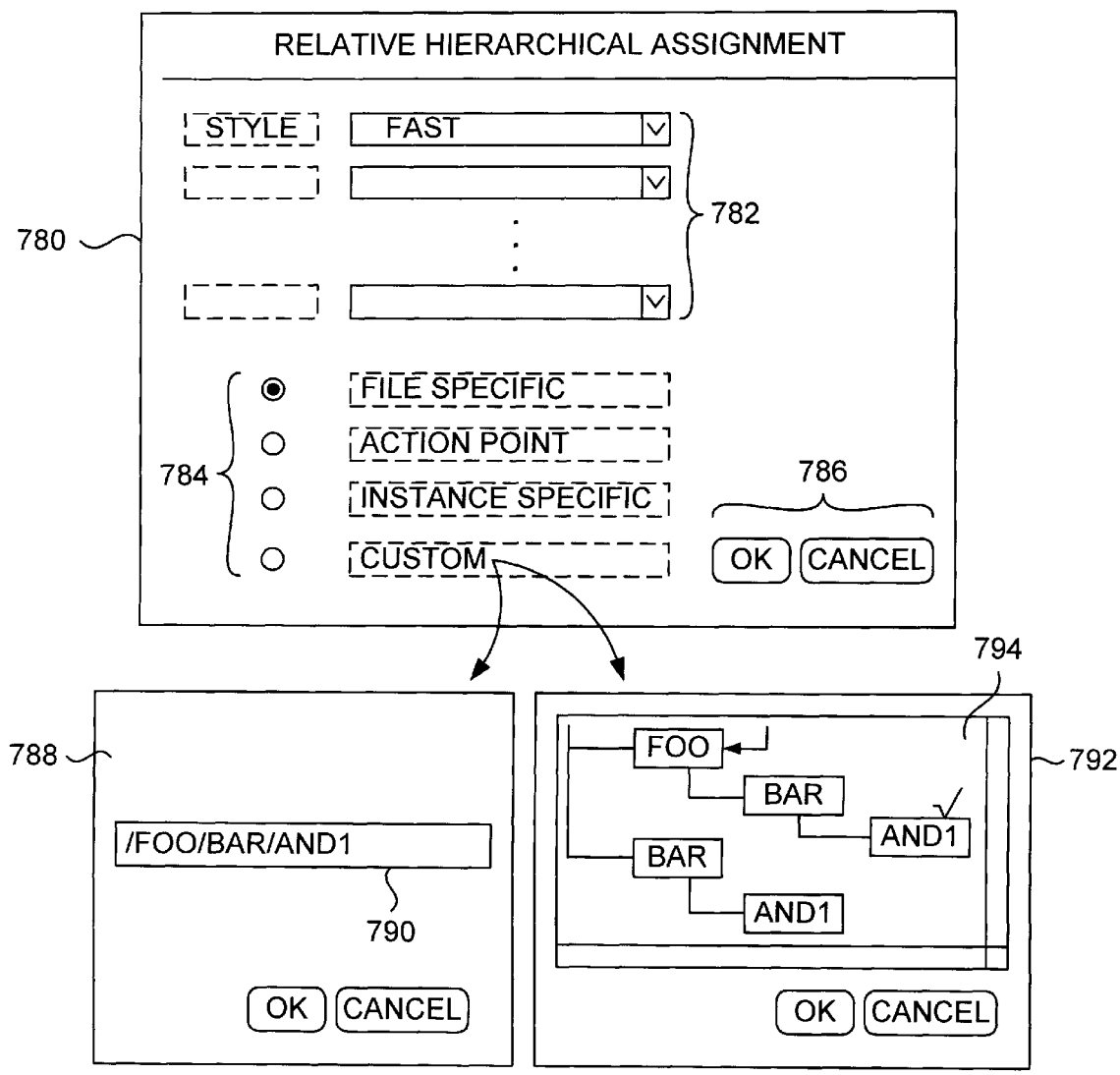
FIG. 7 illustrates one embodiment of a user interface, for use with a design tool operating on a computer system, that can be used by a circuit designer in entering a conventional assignment or a relative hierarchical assignment (RHA) in accordance with one embodiment of the present invention.

FIG. 7 illustrates one embodiment of a user interface 780, for use with a design tool, that can be presented to the designer for entering a conventional assignment or a RHA in accordance with the present invention. User interface 780 can, for example, be a graphical user interface window that is displayed on a monitor of a computer system that includes a processor configured to run the design tool. It may appear, for example, in response to the user clicking on (with a mouse) a particular instance of a design entity. The window will give the user the option to apply different types of assignments. It will also give the user the option to specify a particular point of attachment for the assignment.

As illustrated, user interface 780 provides the designer with a streamlined approach to inputting/specifying particular attributes, e.g., make assignments, relating to one or more circuits, components and/or design blocks within the hierarchy. As shown, the designer can select particular attributes or assignments relating to a particular entity, or set of entities, by way of the assignment control section 782. Assignment control section 782 can, for example, include one or more textual or graphical mechanisms that can be selected by the designer. For example, a textual window assigning "STYLE" equal to "FAST" is shown. Those skilled in the art will recognize that several different types of user input devices and graphical displays can be used to accomplish such input tasks.

Once the designer is satisfied with the assignments made in section 782, the designer can then select how the assignment will be applied to the design. Preferably, the point of application will simply be at the entity selected by the user through a mouse click. Application control section 784 illustrates that the designer can select from a plurality of different application techniques. For example, the designer can select that the assignment be FILE SPECIFIC (e.g., global), applied to an ACTION POINT (e.g., RHA) or be INSTANCE SPECIFIC (e.g., the point of attachment equals the root and point of application equals the selected design entity).

In addition, the designer may want to apply the selected assignment to particular entities by way of a CUSTOM application. For example, as illustrated, a CUSTOM selection may include a custom window 788 having a textual entry mechanism 790 into which the designer enters a path, such as an RHA path, or a point of attachment and/or point of application. Optionally, as illustrated, a CUSTOM selection may further include a custom window 792 having a graphical entry mechanism 794 through which the designer specifies a path, such as an RHA path, or a point of attachment and/or point of application (by pointing, clicking, and dragging for example). Once the designer is satisfied with the selections made in sections 782 and 784, the assignment task can be approved by way of approval section 786.

Once the designer has completed the assignment the design tool records the assignment. For example, the assignment can be recorded to one or more data files that are processed during the compilation processes. While the recording of data such as this can be accomplished in many known way, in the preferred embodiment an assignment, such as an RHA, is recorded to a data file in a textual format that represents the relative hierarchical path and the attribute (s) to be set. Thus, for example, if the RHA is "FOO/BAR/AND_A(style=fast)" then the textual string "FOO/BAR/AND_A(style=fast)" will be recorded a related RHA data file. Those skilled in the art will recognize that additional special characters may also be used to increase the information in the character string and/or simplify the compilation processes, etc.

Regardless of the assignment technique, when several assignments are made at different levels within the hierarchy there is often the need to resolve conflicting assignments.

For example, an assignment at a higher level circuit may automatically change or override one or more assignments for a lower level entity. Consider, for example, that an AND gate (with "style"="standard") is included within a flip-flop circuit having itself a "style" attribute equal to "fast". In this situation, the assignment made to the higher level flip-flop will usually cause the AND gates' style attribute to be set to "fast" also.

Figure 8:
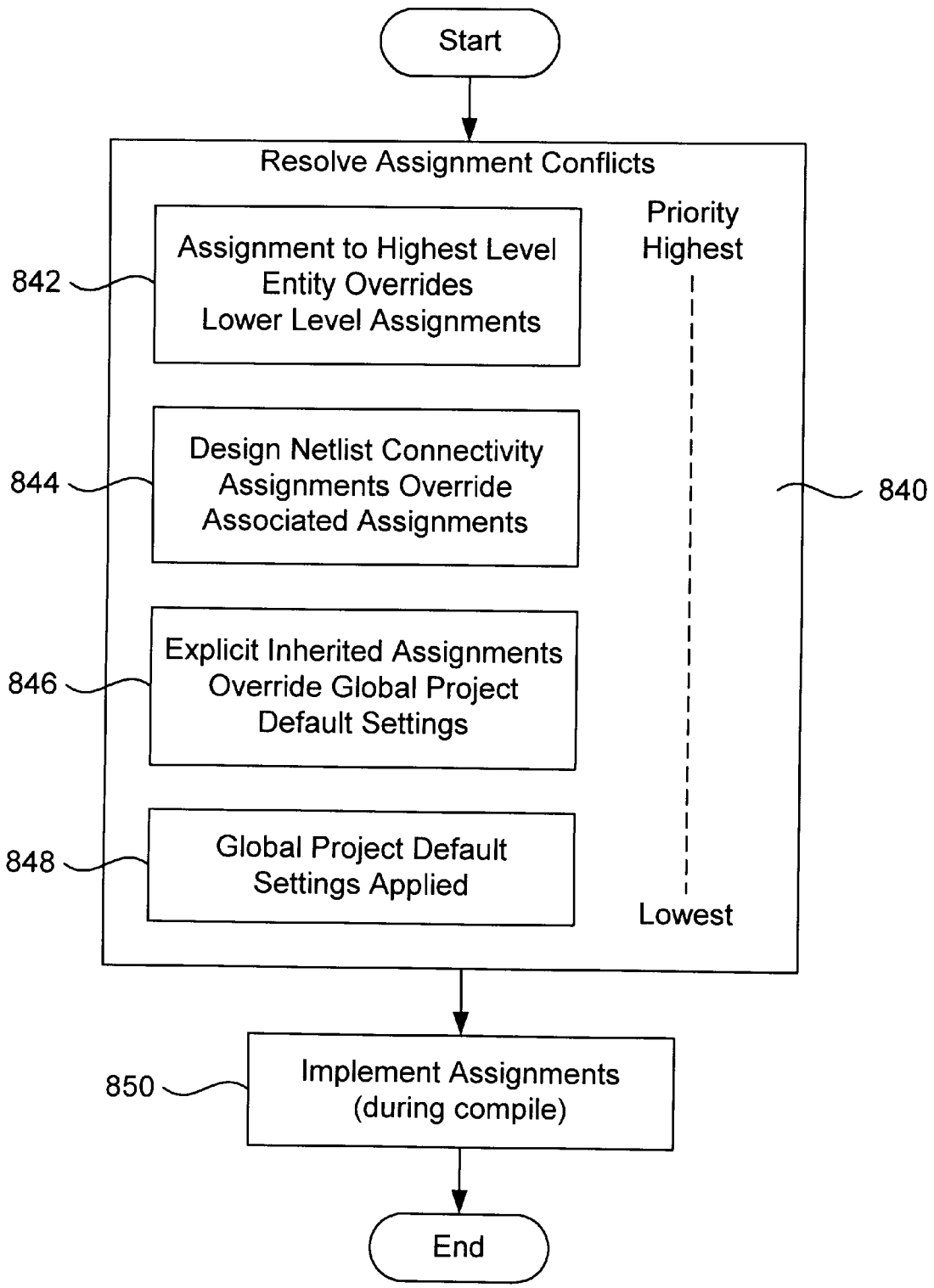
FIG. 8 is a flow-chart illustrating a methodology for resolving conflicts among relative hierarchical assignments.

As shown in FIG. 8, a process 840 includes steps to resolve conflicts between assignments. Steps 842, 844, 846 and 848 represent the preferred "rules" that are used to resolve conflicts between RHAs that affect a given entity. Notice that these steps/rules are preferably evaluated from highest priority (i.e., step 842) to lowest priority (i.e., step 848).

In step 842, which includes the highest priority rule, the assignments to the highest level entity overrides any lower level assignments. Thus, for example, assume that two RHAs were made, the first RHA was "FOO/BAR/AND_A (style=fast)" and the second RHA was "PEARL(style= standard)". In this case for the AND_A entity within PEARL circuit 420', for example, the style setting of "standard" would override the style setting of "fast".

If conflicts remain, in step 844 any design netlist connectivity assignments are allowed to override any associated assignments. Next, in step 846 any explicit inherited assignments are allowed to override global project default settings. Finally, in step 848 any remaining global project default settings are applied. Once the assignment conflicts have been resolved in step 840, then the assignments are implemented in step 850 during the compilation process. The conflict resolution steps in 844, 846 and 848 are known to those skilled in the art.

Computer Systems Associated with Invention

Figure 9A:
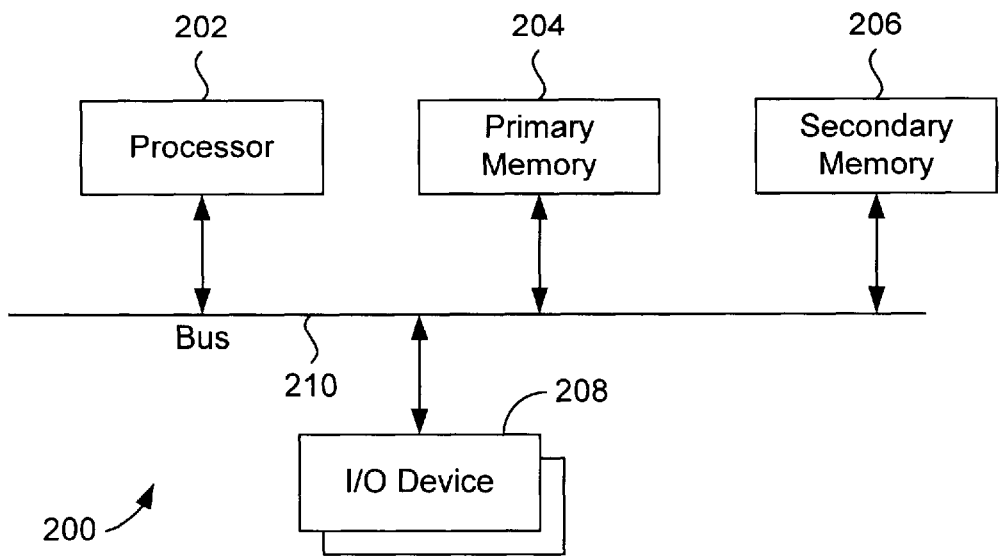
FIG. 9A is a block diagram that illustrates a typical computer system that is suitable for use with one embodiment of the present invention.

FIG. 9A is a block diagram that illustrates one possible computer system 200 suitable for use with one embodiment of the present invention. Computer system 200 includes a processor 202, a primary memory 204, a secondary memory 206, an input/output (I/O) device 208, and a bus 210.

Processor 202 provides the capability to execute computer instructions. Processor 202 can, for example, take the form of a microprocessor, central processing unit (CPU), or microcontroller such as found in many of the desktop, laptop, workstation, and mainframe computers available on the market. Processor 202 can also take the form of conventional or even customized or semi-customized processor. As shown, processor 202 is coupled to input and output data over bus 210.

Primary memory 204 provides for the storage and retrieval of data by processor 202. Primary memory 204 can, for example, be a random access memory (RAM) or like circuit. Secondary memory 206 provides for additional storage and retrieval of data by processor 202. Secondary memory 26 can, for example, take the form of a magnetic disk drive, a magnetic tape drive, an optically readable device such as a CD ROMs, a semiconductor memory such as PCMCIA card, or like device. Secondary memory 26 can, for example, access or read data from a computer program product including a computer-usable medium having computer-readable program code embodied thereon.

I/O device 208 provides an interface to a user through which the user can input data for use by processor 202, and/or processor 202 can output data for use by the user. I/O device 208 can, for example, take the form of a keyboard, a tablet and stylus, a voice or handwriting recognizer, or some other well-known input device such as, of course, a mouse and/or trackball. Likewise, I/O device 208 also represents output devices such as a display monitor, flat panel display, touch-panel, printer, or like device. Thus, a plurality of I/O devices can be provided.

In addition, as is well known, I/O device 208 can also include a programming device (not shown) that is capable of receiving circuit design data created by the user and processor 202 running a design tool application and using this design data to create, program, or otherwise cause an integrated circuit to be produced in accordance with the design data.

Figure 9B:
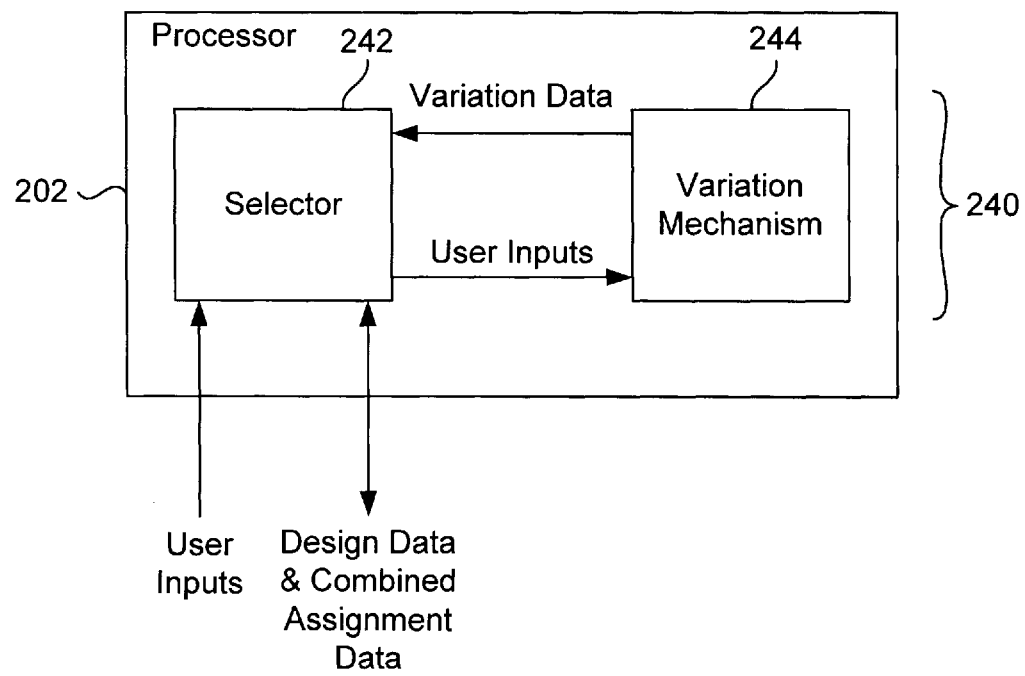
FIG. 9B is a block diagram illustrating one embodiment of a design tool in accordance with the present invention that can, for example, be used with the computer system in FIG. 9A.

FIG. 9B is a block diagram illustrating one embodiment of a design tool 240 in accordance with the present invention that can, for example, be used with the computer system in FIG. 9A. As shown, design tool 240 includes a generic selector 242 and a generic variation mechanism 244. Selector 242 is configured to run on processor 202 and represents the instructions (typically implemented as software) employed for receiving and processing one or more selection inputs from a user via I/O device 208. The selection inputs define the various functions, circuits, connections, pins, etc., that are associated with the design and the hierarchy for the integrated circuit being designed. Selector 242, therefore, can be used to generate, process and/or store data associated with at least one or more of the system specification, the top level block diagram, the design file templates, and/or the various design blocks within the hierarchy. As such, selector 242 can also provide an environment that includes such features as schematic, text and waveform design entry, compilation and logic synthesis, simulation and timing analysis, and device configuration.

Variation mechanism 244 can also be configured to run on processor 202. Variation mechanism 244 represents the instructions (typically implemented as software) employed for providing at least one of a variation entry mode, variation compile mode and a variation comparison mode as described above. To accomplish this, variation mechanism 244 is configured to receive assignment inputs from the user via I/O device 208. The resulting variations and/or lists of variations and related entry, compile and comparison information are then provided to selector 242 and/or otherwise stored in computer system 200. Note that the variation mechanism 244 will be able to provide design variation details to a user interface for display and to a compiler for compilation.

Figure 10:
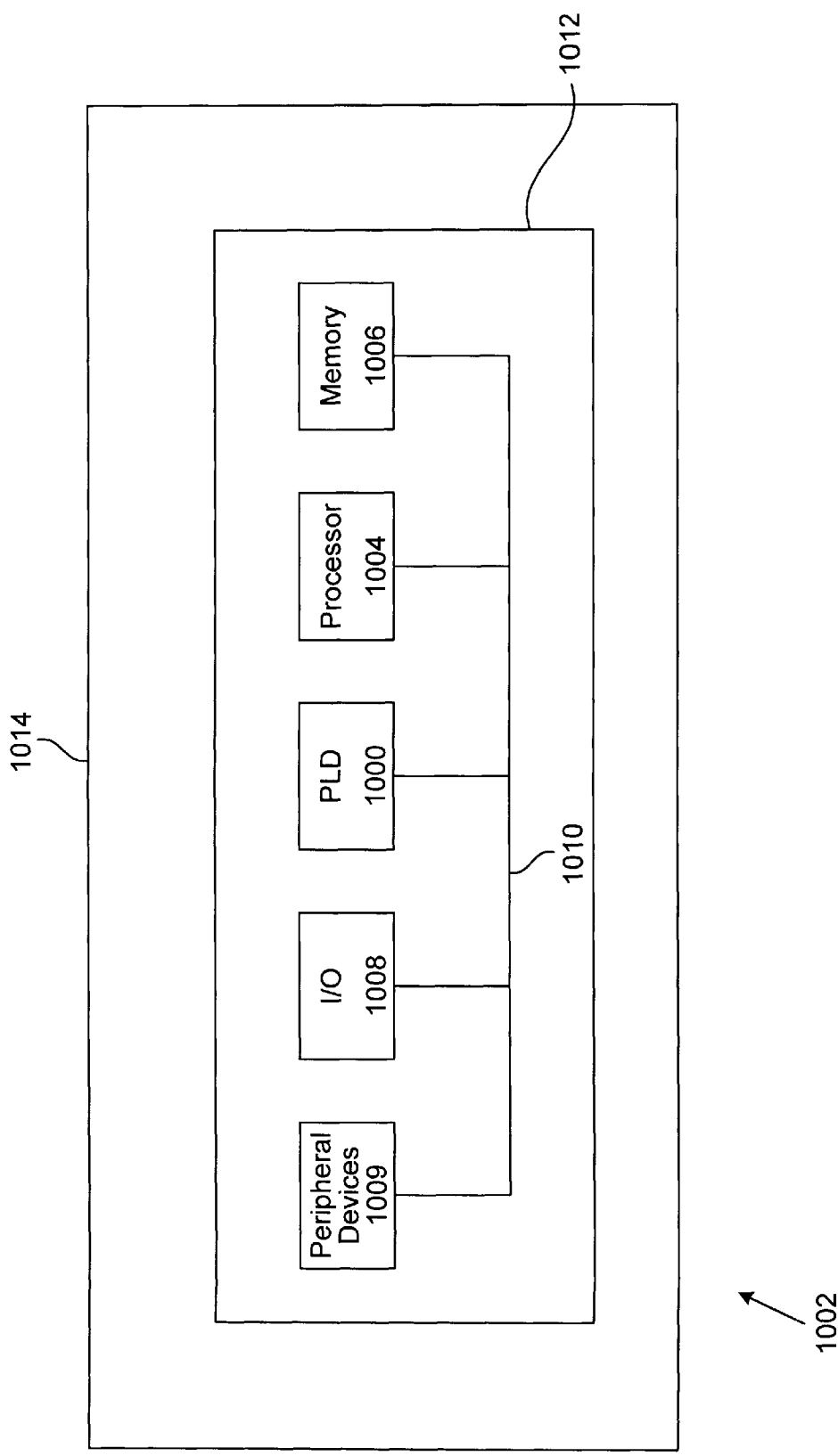
FIG. 10 is a block diagram of a PLD of the present invention in a data processing system.

This invention also relates to programmable logic devices programmed with a design prepared in accordance with the above described methods. The invention further relates to systems employing such programmable logic devices. FIG. 10 illustrates a PLD 1000 of the present invention in a data processing system 1002. The data processing system 1002 may include one or more of the following components: a processor 1004; memory 1006; I/O circuitry 1008; and peripheral devices 1009. These components are coupled together by a system bus 1010 and are populated on a circuit board 1012 which is contained in an end-user system 1014.

The system 1002 can be used in a wide variety of applications, such as computer networking, data networking, instrumentation, video processing, digital signal processing, or any other application where the advantage of using reprogrammable logic is desirable. The PLD 1000 can be used to perform a variety of different logic functions. For example, PLD 1000 can be configured as a processor or controller that works in cooperation with processor 1004. The PLD 1000 may also be used as an arbiter for arbitrating access to a shared resource in the system 1002. In yet another example, the PLD 1000 can be configured as an interface between the processor 1004 and one of the other components in the system 1002. It should be noted that the system 1002 is only exemplary, and that the true scope and spirit of the invention should be indicated by the following claims.

While this invention has been described in terms of several preferred embodiments, there are alterations, permutations, and equivalents which fall within the scope of this invention. It should also be noted that there are may alternative ways of implementing both the process and apparatus of the present invention. For example, additional refinement or processing steps or apparatuses can be included in the various embodiments of the present invention to systematically modify a given variation design in search of a "best design" for a given parameter as may be defined during the compile and/or comparison stages. It is therefore intended that the following appended claims be interpreted as including all such alterations, permutations, and equivalents as fall within the true spirit and scope of the present invention.

What is claimed is:

1. A method for compiling a base design and a variation of an electronic design, the method comprising:
    providing a graphical user interface;
    providing a base design, said base design including one or more data files including assignment data;
    creating a variation design by applying at least one variation assignment to a group of logic functions not provided in the assignment data of said base design, wherein the variation assignment to the group of logic functions specifies at least one of a style, logic option, clique assignment, position requirement, timing requirement, family, device, speed grade and global default parameter;
    using said graphical user interface to display, for compilation, a list of designs including the base design and the variation design;
    with the aid of said graphical user interface, selecting for compilation the base design and the variation design;
    compiling both said base design and said variation design; and
    outputting the compiled base design to a first file designated for said compiled base design and outputting the compiled variation design to a second file designated for said compiled variation design.

2. The method of claim 1, wherein the electronic design is a programmable logic device.

3. The method as recited in claim 1 further comprising comparing the compiled variation design to the compiled base design with the aid of said graphical user interface.

4. The method as recited in claim 1 wherein said variation design includes a representation of an entity within said variation design, which representation includes a first identifier specifying the entity defined within said base design, a second identifier specifying the variation assignment, and a tag identifying the variation assignment as a variation assignment.

5. The method as recited in claim 1 further comprising creating a new plurality of variation designs by further adding at least one additional variation assignment to each of said plurality of variation designs.

6. The method as recited in claim 5 wherein each of said variation designs includes a representation of an entity within said variation design, which representation includes a first identifier specifying the entity defined within said base design, a second identifier specifying the variation assignment, and a tag identifying the variation assignment as a variation assignment.

7. An apparatus for use in designing electronic designs, said apparatus comprising:
    a selector configured to provide a base design in the form of one or more data files including assignment data; and
    a variation mechanism configured to create a variation design by applying at least one variation assignment to a group of logic functions not provided in the assignment data of said base design, wherein the variation assignment to the group of logic functions specifies at least one of a style, logic option, clique assignment, position requirement, timing requirement, family, device, speed grade and global default parameter;
    a compiler configured to compile the base design and the variation design; and
    a graphical user interface for displaying a list of designs for compilation including the base design and the variation design, selecting said base design and said variation design and initiating compilation of said base design and said variation design.

8. The apparatus as recited in claim 7 wherein said graphical user interface provides a tool coupled to said variation mechanism for creating said variation design.

9. The apparatus as recited in claim 7 wherein said variation mechanism is further configured to generate output data comparing compiled versions of said base design circuit and said variation design circuit.

10. The apparatus as recited in claim 7 wherein said assignment data and said variation assignment include at least one attribute that is selected from a group consisting of a logic option, a timing requirement, a position requirement, and a clique assignment.

11. The apparatus as recited in claim 7 wherein said variation design includes a representation of an entity within said variation design, which representation includes a first identifier specifying the entity defined within said base design, a second identifier specifying the variation assignment, and a tag identifying the variation assignment as a variation assignment.

12. The apparatus as recited in claim 7 wherein said variation mechanism is further configured to create a new plurality of variation designs by further adding at least one of a plurality of variation assignments associated with each of said plurality of variation designs to said assignment data.

13. The apparatus as recited in claim 12 wherein each of said variation designs includes a representation of an entity within said variation design, which representation includes a first identifier specifying the entity defined within said base design, a second identifier specifying the variation assignment, and a tag identifying the variation assignment as a variation.

14. A design tool for use with a computer system having a processor, said design tool comprising:
    a selector configured to run on said processor and capable of accepting selection inputs from a user via said computer system and providing a base design in the form of one or more data files including assignment data;
    a variation mechanism configured to run on said processor and responsive to variation inputs from said user via said computer system and said selector, said variation mechanism being capable of generating a variation design by adding at least one variation assignment to a group of logic functions to said assignment data wherein the variation assignment to the group of logic functions specifies at least one of a style, logic option, clique assignment, position requirement, timing requirement, family, device, speed grade and global default parameter; and a compiler configured to compile the base design and the variation design; and a graphical user interface for displaying a list of designs for compilation including the base design and the variation design, selecting said base design and said variation design and initiating compilation of said base design and said variation design.

15. The design tool as recited in claim 14 wherein said graphical user interface provides a tool coupled to said variation mechanism for creating said variation design.

16. The design tool as recited in claim 15 wherein said variation mechanism is further configured to generate output data comparing compiled versions of said base design and said variation design.

17. The design tool as recited in claim 15 wherein said compiled base design is in a format suitable for use with a programming device configured to produce an integrated circuit according to instructions in said base design.

18. The design tool as recited in claim 14 wherein said variation assignment includes at least one attribute that is selected from a group consisting of a logic option, a timing requirement, a position requirement, and a clique assignment.

19. The design tool as recited in claim 14 wherein said variation design includes a representation of an entity within said variation design, which representation includes a first identifier specifying the entity defined within said base design, a second identifier specifying the variation assignment, and a tag identifying the variation assignment as a variation assignment.

20. A computer-readable media having a design tool as recited in claim 14 embodied thereon.

21. A computer-readable media having a stored data structure suitable for use in a computer system having circuit design tool abilities capable of supporting multiple variations of a circuit design, the stored data structure comprising:

an identifier associated with an entity defined within a base design;

first data associated with an assignment to said entity within said base design; and second data associated with a variation assignment to a group of logic functions of said entity within a variation design, wherein the variation assignment to the group of logic functions specifies at least one of a style, logic option, clique assignment, position requirement, timing requirement, family, device, speed grade and global default parameter.

* * * * *